United States Patent [19]

Poppe et al.

[11] Patent Number: 5,126,161
[45] Date of Patent: Jun. 30, 1992

[54] STABILIZING AND EMULSIFYING COMPOSITION FOR THE PREPARATION OF LOW-FAT SPREADS

[75] Inventors: Jan Poppe, Lovendegem, Belgium; Robert Rizzotti; Gérard Tilly, both of Carentan, France

[73] Assignee: SANOFi, Paris, France

[21] Appl. No.: 639,274

[22] Filed: Jan. 10, 1991

[30] Foreign Application Priority Data

Jan. 11, 1990 [FR] France .................. 90 00299

[51] Int. Cl.⁵ ........................... A23L 1/05
[52] U.S. Cl. ..................... 426/573; 426/576; 426/603; 426/604; 426/613; 426/654; 426/575
[58] Field of Search ............. 426/573, 576, 575, 654, 426/99, 603, 604, 613

[56] References Cited

U.S. PATENT DOCUMENTS

| | | | |
|---|---|---|---|
| 3,949,094 | 4/1976 | Johson | 426/99 |
| 4,089,981 | 5/1978 | Richardson | 426/576 |
| 4,242,367 | 12/1980 | Igoe | 426/573 |
| 4,303,691 | 12/1981 | Sand et al. | 426/573 |
| 4,479,973 | 10/1984 | Holley | 426/573 |
| 4,686,106 | 8/1987 | Ehrlich | 426/99 |
| 4,759,936 | 7/1988 | Best et al. | 426/576 |
| 4,956,193 | 9/1990 | Cain et al. | 426/576 |
| 4,983,583 | 1/1991 | Ridoux | 514/54 |

FOREIGN PATENT DOCUMENTS

| | | | |
|---|---|---|---|
| 2622198 | 4/1989 | France . | |
| 0113857 | 6/1984 | Japan | 426/576 |
| 2110517A | 6/1983 | United Kingdom . | |
| 2205849A | 12/1989 | United Kingdom . | |

*Primary Examiner*—Jeanette Hunter
*Attorney, Agent, or Firm*—Bacon & Thomas

[57] ABSTRACT

A stabilizing and emulsifying composition for the preparation of low-fat spreads containing from 70 to 85% by weight of gelatin with a gel strength of between 100 and 200 blooms,
from 7.5 to 15% by weight of iota-carrageenan and
from 7.5 to 15% by weight of xanthan.

16 Claims, No Drawings

STABILIZING AND EMULSIFYING COMPOSITION FOR THE PREPARATION OF LOW-FAT SPREADS

The present invention relates to a composition which is useful for the preparation of low-fat spreads which comprise only 20 to 50% by weight of fats, whereas butter or margarine contains about 80% of fats.

The consumer is increasingly demanding this type of product with a pleasant taste but with a lower fat content so that, without appearing to modify his diet, he can reduce his calorie intake, which generates excess weight, and his lipid intake, which reputedly promotes cardiovascular diseases.

Thus the market already offers butter or margarine substitutes or low-fat spreads flavored with cheese, fish, meat or fruit for spreading on bread or on salty or sweet biscuits.

These products, which are essentially water-in-oil emulsions, must be solid but spreadable at their use temperature of between 25° C. and 15° C., or even below, and must not separate in the temperature range to which they may be exposed, i.e. between 3° C.–4° C., the temperature at which they are stored in the refrigerator, and room temperature, which can sometimes reach 30° C., or even between −20° C. and 30° C. in the case of freezing.

To prevent the emulsion from breaking and releasing aqueous droplets when the product is brought to these extreme temperatures or after it has been spread in thin layers, and to obtain products with a suitable consistency and taste, thickening compounds and gelling agents such as proteins, generally derived from milk, gelatin and polysaccharides, including carrageenans, alginates, xanthan, pectin, starches or carboxymethyl celluloses, as well as emulsifiers such as phospholipids of animal or vegetable origin or saturated or unsaturated fatty acid mono- or di-glycerides, are introduced into the aqueous phase.

Thus a conventional spread may be composed of about 40% of fats of animal or vegetable origin, 0 to 8% of milk proteins, 0.5 to 3% of thickeners and gelling agents, 0.1 to 0.5% of emulsifiers, 0.1 to 1% of sodium chloride and 45 to 60% of water, together with flavorings, colors, acids and preservatives where appropriate.

The physical characteristics of low-fat spreads depend essentially on the composition of the fat and the nature of the thickeners and gelling agents in the aqueous phase, and the manufacturer has to choose, from among the raw materials offered to him on the market, those which will give, by themselves or in combination, a suitable texture and plasticity, a melting point above room temperature but close to that prevailing in the mouth, and a neutral taste; he will also look for the minimum cost price and will prefer inexpensive raw materials which can be used in low concentration.

Certain grades of gelatin, namely those with a gel strength of more than 230 blooms and preferably between 250 and 270 blooms, which have a melting point above 30° C. and a high gel strength, make it possible to obtain aqueous phases with suitable physical characteristics when they are used in association with milk proteins; it suffices to introduce from 1 to 3% (w/v) of gelatin, preferably of the acid type, and from 2 to 5% of proteins into the aqueous phase in order to prepare a spread with acceptable characteristics.

On the other hand, it is difficult to obtain a correct low-fat spread with the more common grade of gelatins which have a lower gel strength of between 60 and 200 blooms, even by substantially increasing the amount of proteins or gelatin in the aqueous phase.

Although based on gelatin with a low gel strength, the composition according to the invention does not exhibit these disadvantages; moreover, even when used at a low concentration of 1% to 2% by weight of the aqueous phase, it makes it possible to obtain an aqueous phase whose viscosity is already appreciable at elevated temperature, above 50° C., and increases uniformly as the temperature drops; furthermore, if the spreads are prepared in exchangers with a smoothed surface, the temperature range in which phase inversion can be effected is wider.

According to a first feature, the present invention relates to a composition consisting of a mixture of gelatin—preferably of the B type, i.e. obtained by the basic hydrolysis of collagen—with a gel strength of between 100 and 200 blooms, iota-carrageenan and xanthan, in proportions of 70 to 85% by weight of gelatin, 7.5 to 15% by weight of carrageenan and 7.5 to 15% by weight of xanthan. The compositions of the invention can be prepared by simply dry-mixing the three powders in suitable proportions.

If the powders do not have similar particle sizes, the composition can be prevented from becoming heterogeneous on storage by granulating the finest powders to produce similar diameters. In general, it is the polysaccharides which have to be granulated and it has been found that granulation in a fluidized air bed by spraying an aqueous solution of hydrolyzed gelatin, according to a process described in patent application EP-A-313.463, gives excellent results. The hydrolyzed gelatin used for this granulation is a gelatin whose average molecular weight has been reduced by acid, basic or enzymic hydrolysis so that it no longer has a gel strength which is measurable by the bloom method under the conditions defined in French Standard NF-V 59.001 of October 1982. The resulting granulated powders of pure polysaccharides or polysaccharides in a mixture contain from 2% to 10% by weight of hydrolyzed gelatin relative to the weight of polysaccharide.

It is also possible to modify the particle size of the polysaccharide powders by coating the grains with an emulsifier; it is known that an emulsifier is necessary for the preparation of spread emulsions, but it is introduced either into the aqueous phase or into the oily phase just before they are mixed. The polysaccharides can be coated with the emulsifier by any technique, but it is preferred to suspend the polysaccharide powders in the molten emulsifier and spray the suspension into a stream of cold air in order to collect the polysaccharides coated with 50% to 70% by weight of emulsifier relative to the final weight. Of the emulsifiers which are commonly used in the field and are solid at room temperature, it is preferred to use mono- and di-glycerides of edible fatty acids, separately or in a mixture. The compositions obtained by mixing these coated polysaccharides with gelatin are homogeneous but also more readily dispersible in an aqueous medium.

Examples of compositions according to the invention and the preparation of low-fat spreads are described below. The viscosities of the solutions are measured with a Brookfield LVT type viscometer equipped with a n° 3 spindle and rotating at 60 rpm. The gel strengths are measured by applying the bloom method described in French Standard NF-V 59-001.

EXAMPLE 1

8 g of type B gelatin with a particle size of less than 0.6 mm are mixed with 1 g of iota-carrageenan and 1 g of xanthan with particle sizes of less than 0.15 mm.

The gelatin has a gel strength of 125 blooms.

The carrageenan, in 1.5% (w/v) aqueous solution containing 0.75% of NaCl, has a gelling power of between 180 and 200, which is the value obtained on a penetrometer of the Sommer and Runge type(Germany) of ref. 18005, equipped with a 15 g rod and a 35 g penetrating body.

The xanthan, in 1% (w/v) aqueous solution containing 1% of KCl, has a viscosity of 1200 to 1600 mPa.s at 25° C., measured with a Brookfield LVT apparatus rotating at 60 rpm.

The viscosity of an aqueous phase prepared by heating 10 g of this mixture, 30 g of skimmed milk powder, 5 g of NaCl and 555 ml of water is substantially constant between 80° C. and 60° C. and is of the order of 200 mPa.s; it then increases slightly as the temperature drops to around 20° C., reaching about 800 mPa.s; below this temperature, it increases very sharply to exceed 15,000 mPa.s at around 12° C.

EXAMPLE 2

Coated iota-carrageenan is prepared by dispersing 400 g of the carrageenan powder used in Example 1 in 600 g of a molten emulsifier (Admul ® MG 4103 marketed by PPF Int. (NL) a mono-diglyceride made from edible oils and fats) and then spraying this suspension into a stream of cold air to give beads, which are screened on a sieve with a mesh diameter of 0.595 mm.

Under the same conditions, coated xanthan is prepared from 450 g of the xanthan used in Example 1 and 550 g of emulsifier.

630 g of type B gelatin powder with a gel strength of 125 blooms, 200 g of coated carrageenan and 170 g of coated xanthan are dry-mixed.

This composition according to the invention is used to prepare a spread containing 41% of fats of vegetable origin; the oily phase is prepared by mixing 1.48 kg of hydrogenated copra fat (m.p.=32° C.) and 3.44 kg of sunflower oil in a vat kept at 70° C., with stirring. The aqueous phase is prepared separately by dispersing 0.6 kg of powdered milk proteins, 0.06 kg of sodium chloride, 0.024 kg of potassium sorbate, 0.007 kg of $\beta$-carotene and 0.156 kg of composition according to the invention in 6.3 kg of water at 60° C., with vigorous stirring.

The aqueous phase at 55° C. is introduced into the oily phase at the same temperature and the homogeneous mixture is then introduced into a heat exchanger with a smoothed surface, of the Combinator type marketed by Schoeder (FRG); on leaving, the mixture passes through a first cooler, at 20° C., and is then malaxated in a texturizer before passing through a second cooler; it is then conditioned in a boat at 12° C.

The product prepared in this way can be spread straight from the refrigerator, there is no water/fat separation and it is pleasant to eat because there is no sticky sensation, which masks the taste, and melting is pleasant in the mouth.

A spread having the same qualities can be prepared by replacing the vegetable fat with 4.92 kg of dried milk fat melting at 34° C.

EXAMPLE 3

A composition according to the invention is prepared by dry-mixing 7.5 g of lime-treated ossein gelatin (type B), with a gel strength of 125 blooms, with 1.25 g of iota-carrageenan powder and 1.25 g of xanthan powder.

A typical aqueous phase is prepared in the manner described in Example 1; the viscosity, which increases from 200 to 800 mPa.s between 80° C. and 40° C., is 2400 mPa.s at around 20° C. and then increases sharply below this temperature to reach 20,000 mPa.s at around 12° C.

This composition is used to prepare a spread containing 41% of fats whose oily phase is identical to that described in Example 2, but whose aqueous phase consists of 0.12 kg of sodium caseinate, 0.06 kg of sodium chloride, 0.024 kg of potassium sorbate, 0.007 kg of beta-carotene, 0.120 kg of composition according to the invention, 0.036 kg of Admul ® MG 4103 and 6.713 kg of water to 4.92 kg of oily phase.

What is claimed is:

1. A thickening and gelling composition for the manufacture of low-fat spread, comprising 20-50% by weight of fat, which composition comprises from 70-85 % by weight of gelatin with a gel strength of between 100 and 200 blooms, from 7.5-15% by weight of iota-carrageenan and from 7.5-15% by weight of xanthan.

2. A composition according to claim 1, wherein said gelatin is of the B type.

3. A composition according to claim 1, wherein the iota-carrageenan and/or the xanthan are granulated with gelatin which has no gel strength.

4. A composition according to claim 1, wherein the iota-carrageenan and/or the xanthan are coated with an emulsifier which is solid at room temperature.

5. A composition according to claim 4, wherein the emulsifier consists of fatty acid monoglycerides, fatty acid diglycerides or mixtures thereof.

6. A composition according to claim 1, wherein the type B gelatin has a gel strength of 125 blooms, the iota-carrageenan has a gelling power of 180 to 200 and the xanthan has a viscosity of between 1200 and 1600 mPa.s.

7. A composition according to claim 2, wherein the type B gelatin has a gel strength of 125 blooms, the iota-carrageenan has a gelling power of 180 to 200 and the xanthan has a viscosity of between 1200 and 1600 mPa.s.

8. A composition according to claim 3, wherein the type B gelatin has a gel strength of 125 blooms, the iota-carrageenan has a gelling power of 180 to 200 and the xanthan has a viscosity of between 1200 and 1600 mPa.s.

9. A composition according to claim 4, wherein the type B gelatin has a gel strength of 125 blooms, the iota-carrageenan has a gelling power of 180 to 200 and the xanthan has a viscosity of between 1200 and 1600 mPa.s.

10. A composition according to claim 5, wherein the type B gelatin has a gel strength of 125 blooms, the iota-carrageenan has a gelling power of 180 to 200 and the xanthan has a viscosity of between 1200 and 1600 mPa.s.

11. A composition according to claim 2, wherein the iota-carrageenan and/or the xanthan are granulated with gelatin which has no gel strength.

12. A composition according to claim 2, wherein the iota-carageenan and/or the xanthan are coated with an emulsifier which is solid at room temperature.

13. A composition according to claim 12, wherein the emulsifier consists of fatty acid monogylcerides, fatty acid diglycerides or mixtures thereof.

14. A composition according to claim 11, wherein the type B gelatin has a gel strength of 125 blooms, the iota-carrageenan has a gelling power of 180 to 200 and the xanthan has a viscosity of between 1200 and 1600 mPa.s.

15. A composition according to claim 12, wherein the type B gelatin has a gel strength of 125 blooms, the iota-carrageenan has a gelling power of 180 to 200 and the xanthan has a viscosity of between 1200 and 1600 mPa.s.

16. A composition according to claim 13, wherein the type B gelatin has a gel strength of 125 blooms, the iota-carrageenan has a gelling power of 180 to 200 and the xanthan has a viscosity of between 1200 and 1600 mPa.s.

* * * * *